United States Patent [19]

Schwab et al.

[11] Patent Number: 5,007,820
[45] Date of Patent: Apr. 16, 1991

[54] MACHINE FOR KNEADING DOUGH PORTIONS INTO A ROUND SHAPE

[75] Inventors: Wilhelm Schwab, Knittlingen; Gerhard Müller, Asperg, both of Fed. Rep. of Germany

[73] Assignee: Werner & Pfleiderer, GmbH, Fed. Rep. of Germany

[21] Appl. No.: 362,070

[22] Filed: Jun. 6, 1989

[30] Foreign Application Priority Data

Jun. 22, 1988 [DE] Fed. Rep. of Germany ....... 3821045

[51] Int. Cl.⁵ .............................................. B21C 3/00
[52] U.S. Cl. .................................... 425/333; 425/363
[58] Field of Search ............... 425/332, 333, 101, 391, 425/200, 197, 200, 363

[56] References Cited

U.S. PATENT DOCUMENTS

| 2,189,214 | 2/1940 | Macfarlane et al. | 425/362 |
| 3,125,039 | 3/1964 | Hang et al. | 425/357 |
| 3,326,143 | 6/1967 | Dubois et al. | 425/333 |
| 3,679,112 | 7/1972 | Black et al. | 226/95 |
| 4,056,346 | 11/1977 | Hayashi | 425/101 |
| 4,395,214 | 7/1983 | Phipps et al. | 425/214 |

FOREIGN PATENT DOCUMENTS 2850936 7/1981 Fed. Rep. of Germany .

Primary Examiner—Willard E. Hoag
Attorney, Agent, or Firm—Laff, Whitesel, Conte & Saret

[57] ABSTRACT

A machine for kneading dough portions into a round shape is provided with a kneading drum adapted to be driven in the peripheral direction and in the direction of an axis. The kneading drum is concentrically enclosed by a compartmented drum adapted to be rotatingly driven in a peripheral direction and has kneading chambers open radially outwardly and radially inwardly towards the kneading drum. Furthermore, the compartmented drum has, looped around a portion of its periphery, in a belt contact zone, a kneading belt which presses the dough portions against the kneading drum and prevents them from falling out of the kneading chambers.

The kneading belt can be driven by a positive drive which is independent of bearing forces between the kneading belt and the surface of the compartmented drum, whereby the kneading belt no substantial bearing forces on the belt contact zone of the compartmented drum.

23 Claims, 5 Drawing Sheets

MACHINE FOR KNEADING DOUGH PORTIONS INTO A ROUND SHAPE

FIELD OF THE INVENTION

The invention relates to a machine for kneading dough portions into a round shape, comprising a kneading drum adapted to be driven in a peripheral direction and in a direction of an axis and with, enclosing the kneading drum concentrically of the axis and adapted to be rotatingly driven in a peripheral direction, a compartmented drum comprising kneading chambers open radially outwardly and radially inwardly towards the kneading drum and further comprising, looped around a part of the periphery of the compartmented drum, in a belt contact zone, a kneading belt which presses the dough portions against the kneading drum, preventing them from falling out of the kneading chambers.

BACKGROUND OF THE INVENTION

In the case of such a machine which is known from U.S. Pat. No. 3,125,039, the kneading belt bears on a contact zone of about 150° C. over its outer periphery on the compartmented drum, with a radially acting force resulting from initial tensioning of the kneading belt such that by reason of the friction between the kneading belt and the compartmented drum, the kneading belt is entrained in a non-slip manner. This applied pressure is generated in that the tension of the kneading belt is adjusted by an adjustable tensioning roller. The tension in the kneading belt is in this case so selected that at the commencement of the kneading process, the kneading belt exerts the necessary pressure on a portion of dough to initiate the kneading process. Towards the end of the kneading process, when the dough portion assumes a spherical shape, the belt is lifted off the compartmented drum by the dough portion. Proper functioning can only be achieved with difficulty, since the friction forces between the compartmented drum and the kneading belt are generally insufficient for trouble-free entrainment. If, for this reason, a jockey roller for the kneading belt is constructed as a belt drive roller, then it is necessary also to have quite a considerable tension in the kneading belt to ensure perfect slip-free driving, which in turn has a very adverse effect on the lifting of the kneading belt from the drum in the kneading zone. Furthermore, in the case of a given compartmented drum, it is only possible for dough portions of substantially the same size to be shaped, as otherwise the portions of dough cannot assume the desired and necessary spherical shape and/or the entraining of the kneading belt by the compartmented drum is affected if too large a portion of the kneading belt is lifted off the compartmented drum.

German Pat. No. 28 50 936 has already disclosed a machine for kneading dough portions into round shapes; it has a similarly constructed kneading drum and a corresponding compartmented drum in which there is in the round-shaping portion of the machine a support which over a part of its length measured in the peripheral direction of the compartmented drum, is disposed at a distance from the periphery of the compartmented drum which increases in the direction of rotation of this latter. This, therefore, provides an exactly defined and widening gap which makes it possible for the dough portions to increase their diameter in accordance with the increasing gap between the kneading drum and the support. This support is constituted by rod-shaped supporting rollers which are disposed on an endlessly revolving driveable chain, an endless kneading belt being loosely laid on these rod-shaped supporting rollers and being driven in the direction of rotation by the dough portions and by the supporting rollers. This prior art machine calls for considerable material cost for the supporting arrangement and in addition considerable cost in terms of adjustability of the widening gap. The development of the dough portions while they are being made to a round shape is not always the same; it is instead dependent firstly upon the type of dough, for example the recipe and the quality of flour, and secondly upon the way the dough is managed, in other words, for example, the fermentation times, dough temperature and the like. A dry dough, for instance, develops more slowly than a more moist dough. Consequently, in the case of a dry dough, the kneading belt will be lifted off the kneading drum later than in the case of a more moist dough. Such fine differences can hardly be taken into consideration with a rigidly adjustable kneading belt regime.

SUMMARY OF THE INVENTION

It is accordingly the object of the present invention of so further developing a machine of the type mentioned at the outset that it is possible to knead into round shapes even dough portions in relatively wide ranges of fluctuating volumes and/or weights with simple means and without any substantial adjustments on the machine.

According to the invention, this problem is solved in that the kneading belt is adapted to be driven by a positive drive which is independent of bearing forces between the kneading belt and the surface of the compartmented drum and in that the kneading belt exerts no substantial bearing forces on the compartmented drum within the belt contact zone. One feature of the invention is that a loose completely or at least substantially non-tensioned kneading belt is provided with a positive drive. Consequently, in accordance with the changes in shape of the dough portions as the round-kneading proceeds, the belt can adapt itself thereto in its distance from the compartmented drum, exerting the necessary counter-pressure on the dough portions in the direction of the kneading drum without, however, being or having to be at an exactly predetermined distance from the kneading drum.

When, over at least a middle portion of the belt contact zone, that side of the kneading belt which is remote from the compartmented drum bears on a thrust belt, and particularly when the thrust belt is elastically and resiliently supported in its longitudinal direction and can be variably pre-tensioned in its longitudinal direction, the kneading belt can over a substantial portion of the belt contact zone, apply an adjustable pressure against the kneading drum, this applied pressure being so chosen that in the final stages of the round-kneading process, the kneading belt is lifted off the compartmented drum by the pressure of the dough portions as they acquire a spherical shape.

According to an alternative solution the kneading belt can be pre-tensioned by a tensioning force, the tensioning force being just sufficient that the kneading belt is lifted off the surface of kneading belt by the dough portions. In this case the kneading belt itself—viewed in its direction of rotation—has a minimal tensioning force applied to it after the positive drive but upstream of the belt contact zone so that it can likewise be lifted off the compartmented drum as the round-kneading process proceeds.

In a further alternative, in which the kneading belt is looped with clearance about the belt contact zone of the compartmented drum, the belt contact portion of the kneading belt may be looped around the compartmented drum with clearance so that to a certain extent it may even sag.

It is particularly advantageous in this respect, when the positive drive is disposed directly upstream of the belt contact zone of the kneading belt. When a brake device is provided behind the belt contact zone, which device acts on the kneading belt, it is ensured that the sag in the kneading belt, in that strand which is running off the compartmented drum cannot affect the tension of the kneading belt in the belt contact zone. This ensures that the entire portion of the rotating belt, between the brake device and the positive drive, is maintained taut, so that the clearance or sag in the kneading belt is largely concentrated on the belt contact zone. In order to be able accurately to adjust the amount by which the kneading belt can be lifted off the compartmented drum by the dough portions, an adjustable setting roller is provided in a region between the belt contact zone and the positive drive.

Further advantages and features of the invention will become apparent from the ensuing description of examplary embodiments taken in conjunction with the drawings.

DESCRIPTION OF THE PREFERRED EMBODIMENTS

Figure 1:
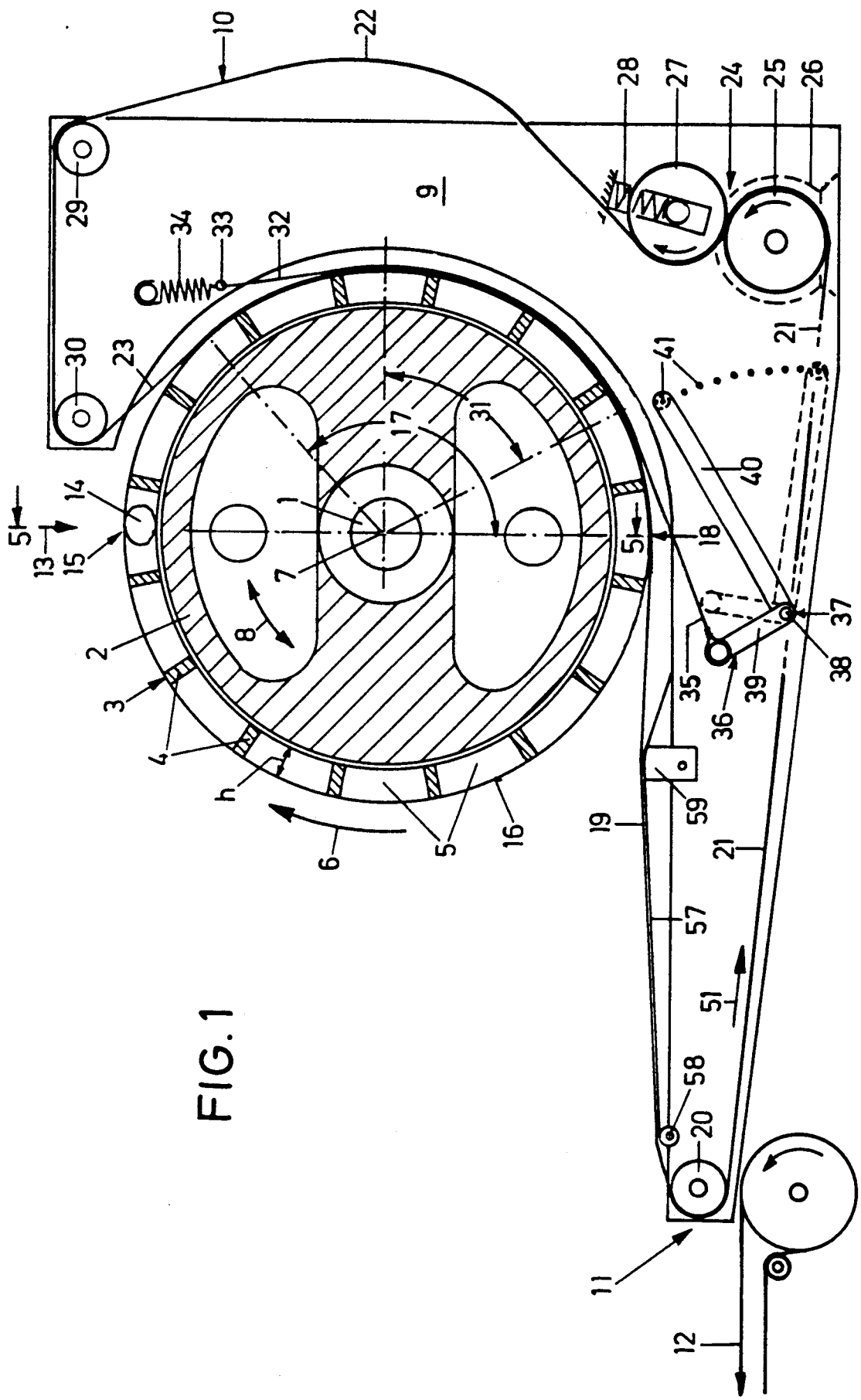
FIG. 1 shows a machine for kneading dough portions in a round shape, viewed from the side, the kneading drum and the compartmented drum being shown in section

Common to all the embodiments is the fact that they comprise a cylindrical kneading drum 2 adapted to be rotatingly driven about a shaft 1. Disposed concentrically around this kneading drum 2 is a compartmented drum 3 which has only minimal clearance in respect of the kneading drum 2. This compartmented drum 3 has over its entire periphery chambers 5 which are separated from one another only by partitions 4, being open in the direction of the kneading drum 2 on the one hand and open towards the outside on the other. The compartmented drum 3 can be driven to rotate in one direction 6 at a constant speed, the direction in which the drawings rotate being the clockwise direction. The kneading drum 2 can be rotatingly driven in the same way in the direction 6, there being superimposed on this rotary movement also a reciprocating rotating or pivoting movement about the axis 7 of kneading drum 2 and compartmented drum 3 and a reciprocating movement in the direction of the axis 7. The reciprocating pivoting or rotary movement of the kneading drum 2 about the axis 7 is shown by the double-headed arrow 8. These types of drive for the kneading drum 2 on the one hand and for the compartmented drum 3 on the other are in practice generally known and generally conventional in the case of such machines for kneading dough portions into round shapes. This kind of kneading is named round-kneading, too.

Also provided is a kneading belt guide frame 9 which serves to store, guide and drive a kneading belt 10, 10', 10''. This guide frame 9 engages around the compartmented drum 3—in relation to the direction of rotation 6—on its under side and on its side which runs from the top downwardly. From here, it extends substantially horizontally as far as an ejection point 11 adjacent to which there is a delivery belt 12. The guide frame 9 extends towards the top of the compartmented drum which is mounted on the horizontal axis 7, to a point just before the top thereof, so that a conventionally portioned lump of dough 14 of predetermined volume and/or weight can be fed from above and in the direction of feed 13 into whichever happens to be the topmost chamber 5. Also such precedent dough portioning devices are generally known, for example from U.S. Pat. No. 3,125,039.

The relevant kneading belt 10, 10', 10'' is so passed around the compartmented drums 3 that—in relation to the direction of rotation 6—it bears in a manner still to be described against the outer surface 16 of the compartmented drum 3 at a point behind the above-mentioned delivery point 15 of a dough portion 14, being looped about a belt contact zone 17 as far as a bottom delivery point 18 for dough portions which is substantially diametrically opposite the feed point 15. From the delivery point or delivery station 18, the relevant kneading belt 10, 10', 10'' passes as an emerging strand 19 at a slight incline to the horizontal as far as the ejector station 11, being deflected through approximately 180° about a non-driven jockey roller 20. From there, it is passed back under the drums 2, 3 as a bottom strand 21 and then passed out over the belt contact zone. From there, it is deflected upwardly through about 90° and runs upwardly as a vertical strand 22, 22', 22'' as far as a point beyond the feed station 15 where it is altogether deflected by roughly more than 180° and runs onto the compartmented drum 3 as a strand 23, 23'' in the manner already described.

In the chambers 5, the dough portions 14 are kneaded by the axial and tangential relative movement of the kneading drum 2 and of the compartmented drum 3 in respect of each other, being braced against the kneading belt 10, 10', 10'' in the belt contact zone 17. With increasing transport in the direction of rotation 6, towards the delivery station 18, in other words as the kneading process is pursued, the dough portions increasingly assume a spherical shape, i.e. they require an increasing radial space in their respective chambers 6. The resultant measures are described one after the other for the individual embodiments.

In this connection, it is still common to all the embodiments that the kneading belt 10, 10', 10'' is driven by a positive drive 24 having a drive roller 25 mounted in the guide frame 9 and which is adapted to be driven by an electric motor 26. The kneading belt 10, 10', 10'' is looped around this drive roller 25 and is pressed by a pressure roller 27 against the outside of the drive roller 25, for example by means of a thrust spring 28. This guarantees a slip-free positive driving of the kneading belt 10, 10', 10" which occurs solely and exclusively by virtue of the positive drive 24, in fact in such a way that the speed of the kneading belt 10, 10', 10" is identical to the peripheral speed of the compartmented drum 3.

In the case of the embodiment shown in FIG. 1, the positive drive 24 is disposed at the transition between bottom strand 21 and vertical strand 22. The vertical strand, as shown in the drawing, runs with quite a lot of clearance over two upper direction reversing rollers 29, 30 and thence as an on-running strand 23 into the belt contact zone 17. In a zone disposed between the start of the belt contact zone 17 and its end, in other words the delivery station 18, there is a pressure applying zone 31 in which there is a pressure applying belt 32, for example in the form of a metal foil, of which the upper end 33 which is adjacent the commencement of the belt contact zone 17, is elastically resiliently secured to the guide frame 9 via a draw spring 34. Its bottom end 35 which is close to the delivery station 18 is mounted on a tensioning device 36 constituted essentially by an angle lever 37 mounted about a pivoting axis 38 in the guide frame 9 which is parallel with the axis 7, in other words horizontal. The pressure belt 32 is fixed on one lever arm 39 while the other lever arm 40 can be locked in various positions on the guide frame 9 by means of a catch device 41. The position of the lever arm 39 in which the pressure belt 32 is most strongly tensioned is shown in solid lines in FIG. 1, while the position of least tension of the pressure belt 32 is shown by broken lines. The other portion 31 ends before the delivery station 18, so that delivery of the completely round-kneaded dough portions 14 is readily possible. Adjustment of the tension of the pressure belt 32 by corresponding selection of the draw spring 34 on the one hand and by correspondingly adjusting the tensioning device 36 on the other is effected in such a way that in the belt contact zone 17, and when no dough portions 14 are present, the kneading belt 10 bears on the outer surface 16 of the compartmented drum 3; while the dough portions 14 are being kneaded to a round shape, and when their diameter per se exceeds the height h of the chambers 5, then without any notable counter-force, it can be lifted from the surface 16 in a radial direction in respect of the axis 7, so that then it exerts only minimal force on the relevant dough portion 14 in the direction of the kneading drum 2 so that the kneading process takes place properly and without interference. In the belt contact zone 17, the kneading belt 10 does not exert on the surface 16 of the compartmented drum 3 any radial forces emanating from its inherent tension.

Figure 2:
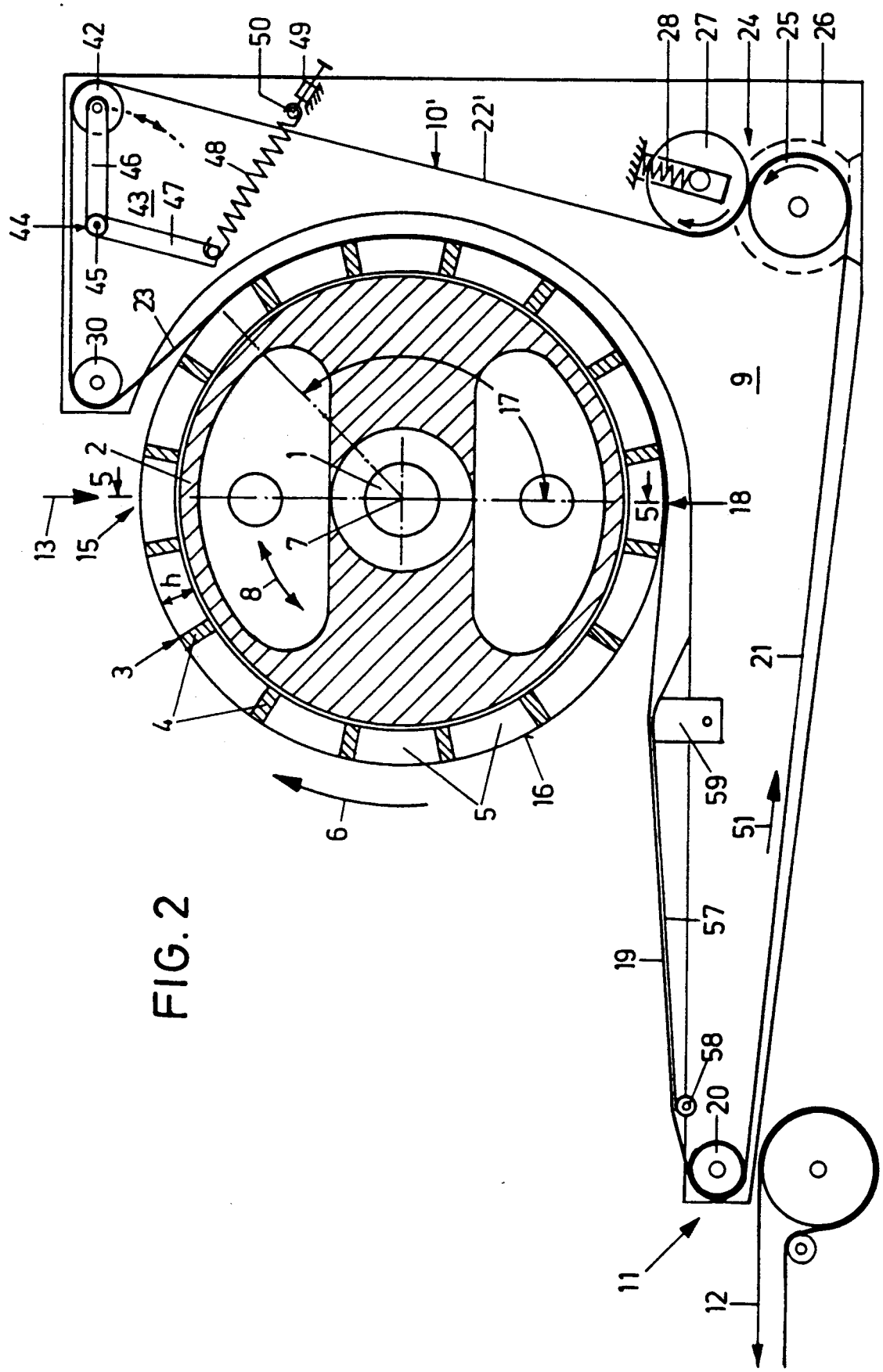
FIG. 2 shows a further embodiment of a machine for kneading dough portions to a round shape, in side elevation, the kneading drum and the compartmented drum being shown in section.

The further development according to FIG. 2 differs from that in FIG. 1 in that no pressure belt is provided and in that instead of the guide roller 29, a tensioning roller 42 is provided in the upper portion of the guide frame 9, being mounted on a tensioning means 43. This comprises an angle lever 44 mounted in the guide frame 9 about a likewise horizontal pivoting axis 45, which is therefore parallel with the axis 7. The tensioning roller 42 is rotatably mounted at the end of one lever arm 46. The end of the other lever arm 47 of the angle lever 44 is engaged by a tensioning spring 48 constructed as a draw spring and fixed to the guide frame 9, an adjusting means 49 being provided to shift the point of attachment 50 of the tensioning spring 48 and thus for variable pretensioning of the tensioning spring 48. The tensioning device 43 is—in the direction 51 of rotation of the kneading belt 10'—disposed behind the positive drive 24. The choice of the spring 48 and of its initial tension by means of the adjusting device 49 and thus the tension of the kneading belt 10' in the belt contact zone 17 are so chosen that when no dough portions 14 are present, the kneading belt 10' bears lightly on the surface 16 of the compartmented drum 3. As the kneading process progresses, the kneading belt 10' can then lift off the surface 16 in the same way as was described hereinabove with regard to FIG. 1.

Figure 3:
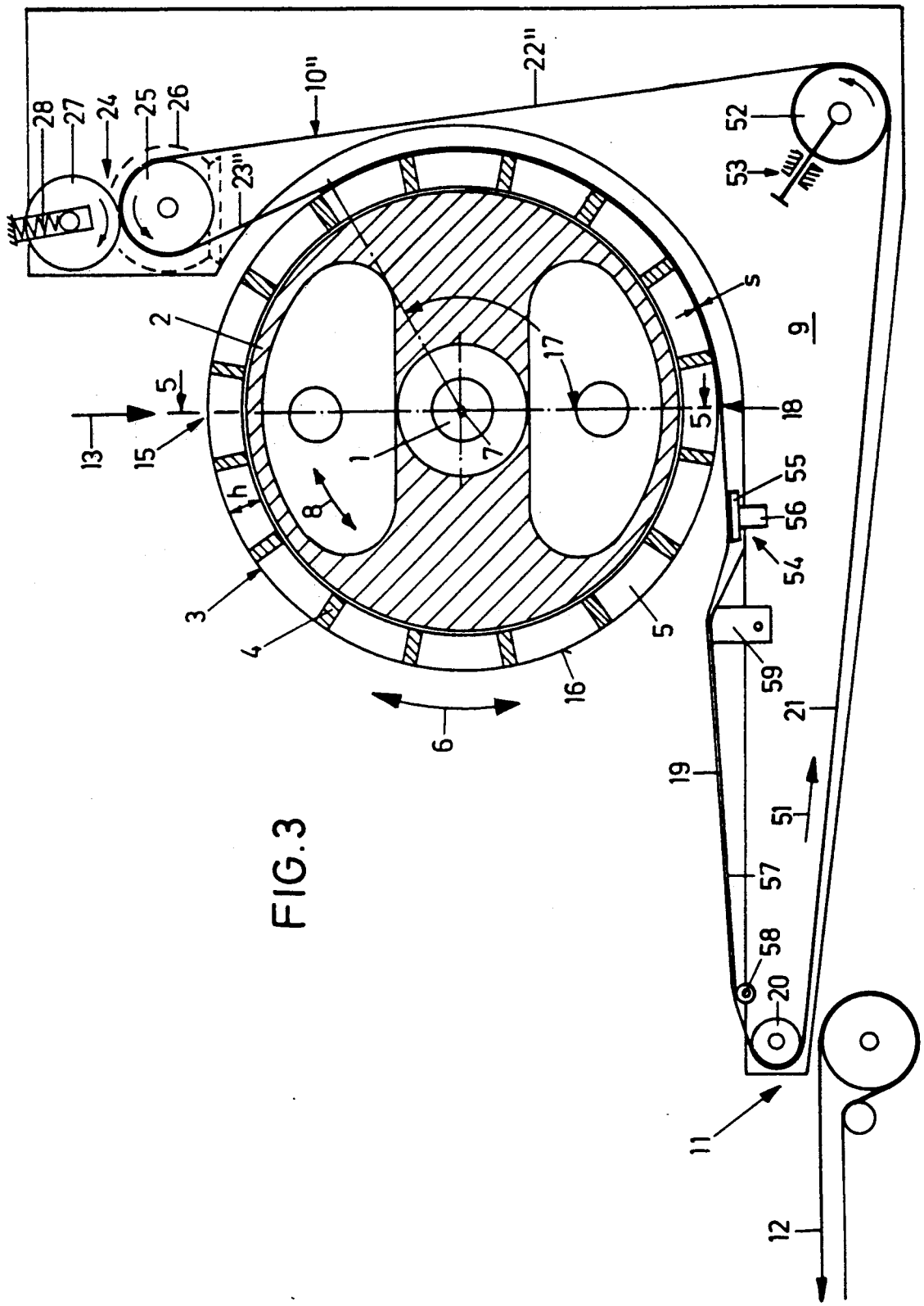
FIG. 3 shows a third embodiment of a machine for kneading dough portions to a round shape, inside elevation, the kneading drum and the compartmented drum being shown in section.

In the case of the embodiment shown in FIG. 3, at the transition from the bottom strand 21 to the vertical strand 22" there is only one adjusting roller 52. The vertical strand 22" leads to the positive drive 24 which in this case is disposed in the upper portion of the guide frame 9, so that the on-running strand 23" of the kneading belt 10" runs directly off the drive roller 25. The adjusting roller 52 is displaceable by means of an adjusting device 53, so that the sag in the kneading belt 10" in the belt contact zone 17 can be adjusted. In other words, it provides a method of varying or adjusting the distance s of the kneading belt 10" in that portion of the belt contact zone 17 which is adjacent the delivery station 18.

So that the sag in the kneading belt 10" relative to the surface 16 of the compartmented drum 5, adjustable by means of the setting device 53, does not have any effect on the emerging strand 19, there is—shortly after the delivery station 18 in relation to the direction of rotation 51—a brake device 54 which may, for example, consist of a vacuum unit 55 which can be connected to a negative pressure source via a negative pressure connection 56. Instead of such a vacuum unit 55, it is also possible to provide a laterally engaging brake shoe or the like. By means of this brake device 54, the emerging strand 19, the bottom strand 21 and the vertical strand 22 are maintained under constant tension so that for a specific setting of the adjusting roller 52 by means of the adjusting device 53, the sag in the kneading belt 10" remains unchanged in the belt contact zone. In order to maintain the consequently sagging portion of the kneading belt 10" as accurately defined as possible, the positive drive 24 is disposed as close as possible to and upstream of the belt contact zone 17. A further essential reason for disposing the brake device 54 at the location mentioned resides in the fact that inevitably the bottom strand 21 has a not inconsiderable weight which leads to a sagging of this bottom strand 21 and thus to a tensioning of the kneading belt 10" against the outer surface 16 of the compartmented drum 3.

After the delivery station 18 and the ejection station 11, it is possible to provide a kneading belt support plate 57 articulated in the vicinity of the guide roller 20 by means of a pivot joint 58, being braced in the vicinity of the delivery station 18 via a vertically adjustable support 59. The distance between the support plate 57 and the delivery station 18 is sufficiently great to avoid adversely affecting free movement of the dough portions 14. The purpose of this support plate 57 lies in damping vibrations exerted on the relevant kneading belt 10, 10', 10" by the compartmented drum 3 or dough portions 14.

Figure 4:
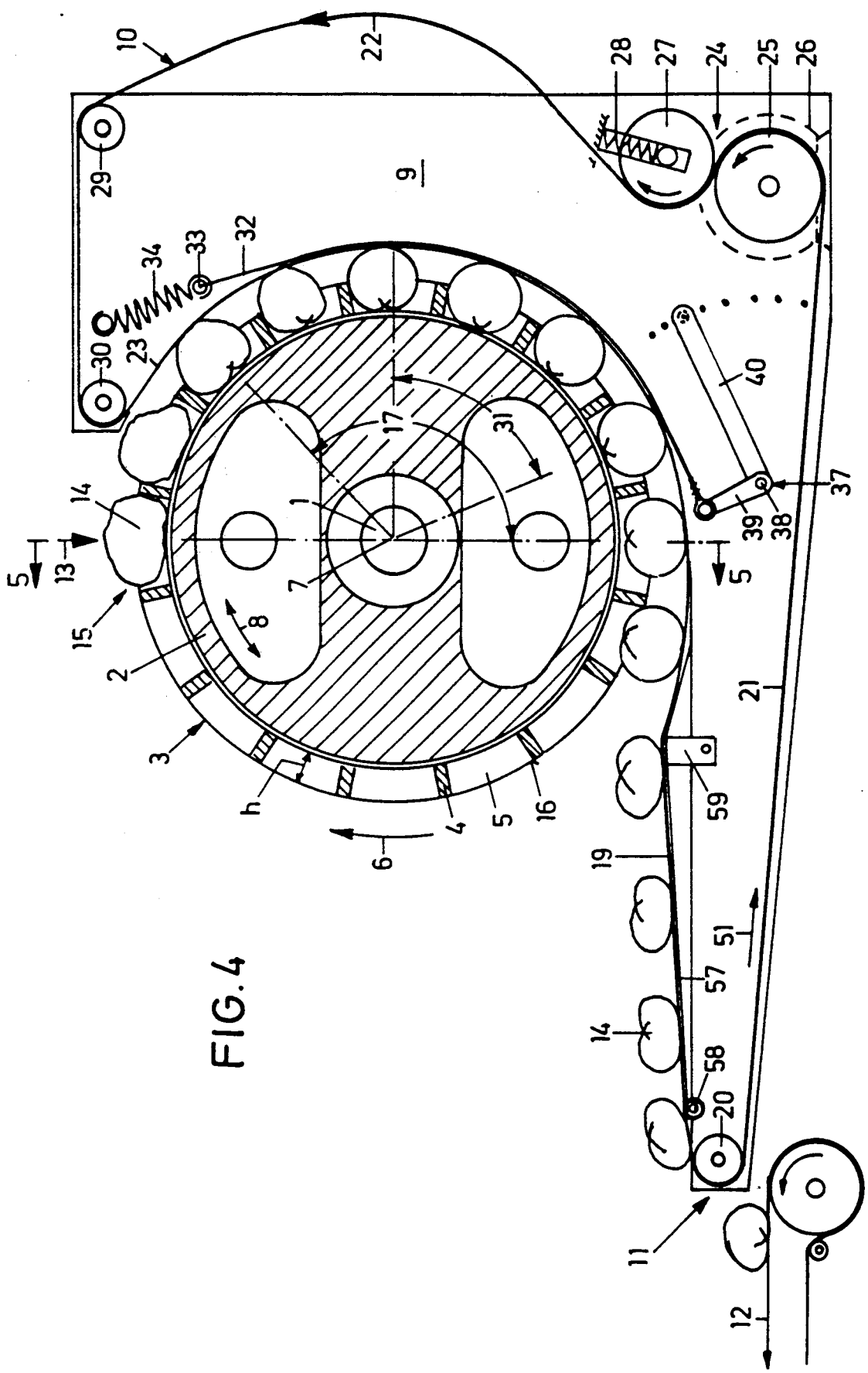
FIG. 4 shows the embodiment according to FIG. 1, illustrating a round-kneading process.

Basically, FIG. 4 is a view identical to that of the embodiment in FIG. 1, relatively large dough portions 14 being fed to the machine to be kneaded. This illustration shows how the dough portions 14 become increasingly rounder over the belt contact zone 17 of the kneading belt 10, which can also be defined as the kneading zone, and also shows what distance there can be between the kneading belt 10 and the outer surface 16 of the compartmented drum 3.

Figure 5:
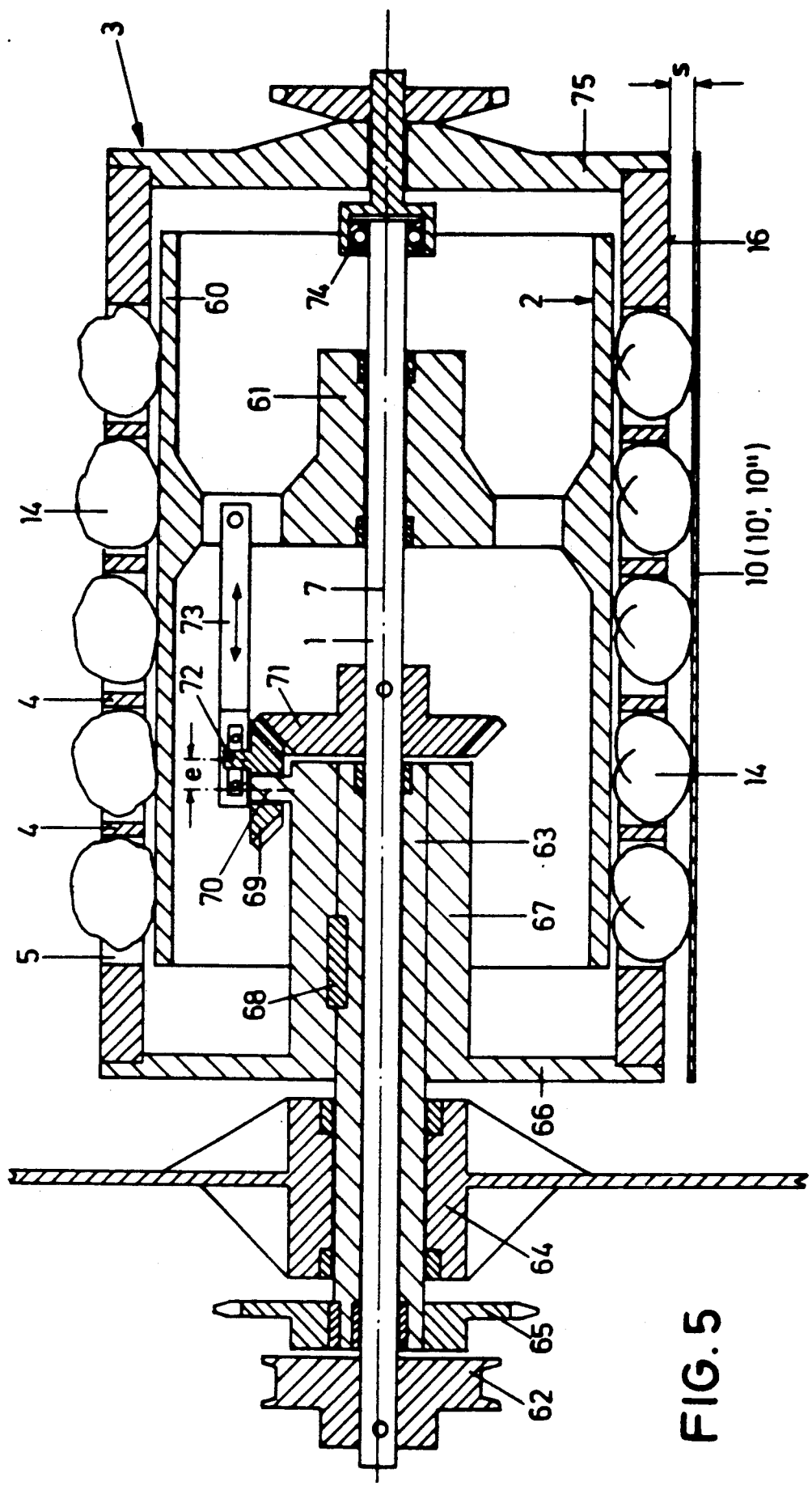
FIG. 5 shows a vertical section through the kneading drum with the compartmented drum taken on the section line V—V in FIGS. 1 to 4.

For the sake of completeness, FIG. 5 shows a longitudinal section through the unit consisting of shaft 1, kneading drum 2 and compartmented drum 3. The kneading drum 2 consists of an outer relatively thin-walled cylinder 60 which is disposed on the shaft 1 in such a way as to be axially displaceable and freely rotatable over a relatively long hub 61. At its outer end, the shaft 1 is provided with a V-belt pulley 62 via which this shaft is rotatingly driven.

The compartmented drum 3 is rotatably supported in a fixed mounting 64 via a hollow shaft 63 which is supported in freely rotatable manner on the shaft 1. Rotationally rigid on the hollow shaft 3 is a toothed belt pulley 65 by means of which the compartmented drum 3 is rotatingly driven. To this end, the compartmented drum 3 has, concentrically mounted on an end wall 66, a bearing sleeve 67 by which it is pushed onto the hollow shaft 63 being rotationally rigidly fixed there by means of a feather connection 68. When the toothed belt pulley 65 is rotatingly driven, therefore, the compartmented drum 3 rotates about the axis 7.

On the bearing sleeve 67, a bevelled gearwheel 69 is mounted to be freely rotatable about an axis 70 at right-angles to the axis 7 and meshes with a further bevelled gearwheel 71 which is rotationally rigid on the shaft 1. If the V-belt pulley 62 and thus also the shaft 1 are rotatingly driven, the bevelled gearwheel 69 is rotated about its axis 70.

Eccentrically of the axis 70, there is on the bevelled gearwheel 69 a crank pin 72 on which is mounted a thrust crank rod 73 which is in turn articulated on the hub 61 of the kneading drum 2. Upon the shaft 1 being rotatingly driven, therefore, the thrust crank rod 73 is reciprocated parallel with the axis 7, so that the kneading drum 2 performs a reciprocating movement in the direction of the axis 7 and in relation to the compartmented drum 3. The travel involved in this axial movement corresponds to twice the distance e between the axis 70 and the crank pin 72.

By means of a bearing 74, the shaft 1 is axially immovably but freely rotatably supported in the other end wall 75 of the compartmented drum 3. It should be repeated that this basic construction of kneading drum 2 with the compartmented drum 3 is generally known and conventional.

What is claimed is:

1. A machine for kneading dough portions into a generally spherical shape, comprising:

a cylindrical kneading drum movable rotatably about the drum central axis and movable axially thereof, the drum having a rotatable, compartmented drum mounted concentrically thereof, the compartmented drum comprising kneading chambers extending radially of the drum and open radially outwardly and radially inwardly toward the kneading drum, the machine further comprising an endless kneading belt looped around the compartmented drum and having a portion in contact with the compartmented drum over a contact zone of less than 180° of peripheral arc of the compartmented drum peripheral surface, wherein the endless belt has a positive drive means which is independent of bearing forces between the belt and the compartmented drum surface, tension of the belt being such that bearing forces exerted by the kneading belt on the compartment drum is less than forces exerted on the belt by the dough portions being kneaded, and wherein the kneading belt is movable radially of the compartmented drum.

2. A machine according to claim 1, wherein the kneading belt can be pre-tensioned by a tensioning force, the tensioning force being just sufficient that the kneading belt is lifted off the surface of the compartmented drum by forces exerted on the kneading belt by the dough portions.

3. A machine according to claim 1, wherein the positive drive is formed by a drive roller with a pressure roller which presses the kneading belt against the drive roller.

4. A machine according to claim 1, wherein downstream of a delivery station of the compartmented drum is a kneading belt support plate to support the kneading belt.

5. A machine according to claim 1, wherein the positive drive is disposed above and adjacent the belt contact zone with the kneading belt.

6. A machine according to claim 5, wherein a brake device is provided adjacent the belt contact zone such as to act on said portion of the kneading belt emerging from contact with the compartmented drum.

7. A machine according to claim 1, wherein over a portion of a belt contact zone, that side of the kneading belt which is remote from the compartmented drum bears against a thrust belt.

8. A machine according to claim 7, wherein the thrust belt has elastic tensioning means.

9. A machine according to claim 8, wherein the thrust belt can be variably pre-tensioned in its longitudinal direction.

10. A machine according to claim 8, wherein an adjustable setting roller is provided between the belt contact zone and the positive drive means.

11. A machine according to claim 8, wherein the positive drive means is disposed upstream of and adjacent the belt contact zone of the kneading belt.

12. A machine for kneading dough portions into a round shape, comprising a cylindrical kneading drum having an axis and adapted to be driven in a rotationally around said axis and axially of said axis and with a rotatable compartmented drum enclosing the kneading drum concentrically, the compartmented drum comprising radial kneading chambers which are open radially outwardly and radially inwardly towards the kneading drum the machine further comprising, looped around the compartmented drum in a belt contact zone an endless kneading belt for pressing the dough portions, prevent them from falling out of the kneading chambers, which belt contact zone extends over less than 180° of arc of an outer surface of the kneading drum, and to which belt contact zone the kneading belt is fed as an entering strand and from which belt contact zone the kneading belt passes as an emerging strand, wherein the endless kneading belt has a positive drive means which is independent of bearing forces between the kneading belt and said surface of the compartmented drum and wherein the bearing belt has tension such that bearing forces exerted by the kneading belt on the compartmented drum within the belt contact zone are smaller than forces exerted against the kneading belt by the dough portions being kneaded into a round shape, and wherein over at least a middle portion of the belt contact zone, that side of the kneading belt which is remote from the compartmented drum bears on a thrust belt.

13. A machine according to claim 12, wherein the positive drive means is formed by a drive roller with a pressure roller which presses the kneading belt against the drive roller.

14. A machine according to claim 12, wherein downstream of a delivery station of the compartmented drum is a kneading belt support plate to support the kneading belt.

15. A machine according to claim 12, wherein the thrust belt has elastic tensioning means.

16. A machine according to claim 15, wherein the thrust belt has variable tensioning means.

17. A machine for kneading dough portions into a round shape, comprising a cylindrical kneading drum having an axis and rotable about said axis and movable axially and a compartmented drum, enclosing the kneading drum concentrically of the axis and rotable around said axis, the compartmented drum comprising kneading chambers which are open radially outwardly of said axis and radially inwardly toward said axis and inwardly towards the kneading drum and further comprising, looped around the compartmented drum in a belt contact zone, an endless kneading belt for pressing the dough portions against the kneading drum to prevent them from falling out of the kneading chambers, which belt contact zone extends over an arc of less than 180° of an outer surface of the kneading drum, and to which belt contact zone the kneading belt is fed as an entering and from which belt contact zone the kneading belt passes as an emerging strand, wherein the endless kneading belt has a positive drive means which is independent of bearing forces between the kneading belt and said surface of the compartmented drum and the kneading bearing tension such that bearing forces exerted by the kneading belt on the compartmented drum within the belt contact zone are smaller than forces exerted to the kneading belt by the dough portions being kneaded into a round shape, and wherein the kneading belt has pre-tensioning means for applying a tensioning force, which is just sufficient that the kneading belt is lifted off the surface of the compartmented drum by forces exerted on the kneading belt by the dough portions.

18. A machine according to claim 17, wherein the positive drive means includes a drive roller with a pressure roller which presses the kneading belt against the drive roller.

19. A machine according to claim 17, wherein downstream of a delivery station of the compartmented drum is a kneading belt support plate to support the kneading belt.

20. A machine for kneading dough portions into a round shape, comprising a cylindrical kneading drum having an axis and rotatable around said axis and movable axially and having a compartmented drum, enclosing the kneading drum concentrically of the axis rotatable around said axis, the compartmented drum comprising kneading chambers which are open radially outwardly of said axis and radially inwardly toward said axis inwardly towards the kneading drum and further comprising an endless belt, looped around the compartmented drum in a belt contact zone for pressing the dough portions against the kneading drum to prevent them from falling out of the kneading chambers, which belt contact zone extends over less than 180° of arc of an outer surface of the kneading drum, and to which belt contact zone the kneading belt is fed as an entering strand and from which belt contact zone the kneading belt passes as an emerging strand, wherein the endless kneading belt is has a positive drive which is independent of bearing forces between the kneading belt and said surface which forces within the belt contact zone are smaller than forces exerted against the kneading belt by the dough portions being kneaded into a round shape, and wherein a brake device is disposed behind and adjacent the belt contact zone for acting on said emerging strand of the kneading belt.

21. A machine according to claim 20, wherein an adjustable setting roller is provided between the belt contact zone and the positive drive.

22. A machine according to claim 20, wherein the positive drive is formed by a drive roller with a pressure roller disposed for pressing the kneading belt against the drive roller.

23. A machine according to claim 20, wherein downstream of a delivery station of the compartmented drum is a kneading belt support plate to support the kneading belt.

* * * * *